United States Patent [19]

Miller

[11] 4,403,597
[45] Sep. 13, 1983

[54] HEAT TRANSFER DEVICE

[76] Inventor: Don J. Miller, 5036 Barron Dr. NW., Calgary, Alberta, Canada, T2E 6R7

[21] Appl. No.: 225,662

[22] Filed: Jan. 16, 1981

[51] Int. Cl.³ .......................... A47J 37/00; F23D 3/40
[52] U.S. Cl. ............................... 126/41 R; 126/25 R; 431/326
[58] Field of Search .................... 126/29, 9 B, 9 R, 55, 126/22, 41 R, 92 R, 92 AC, 152 R, 152 B, 25 R; 431/328, 125, 326

[56] References Cited
U.S. PATENT DOCUMENTS 2,985,097  5/1961  Nevin .............................. 126/431 X
3,967,613  7/1976  Rybak ............................. 126/41 R
4,290,408  9/1981  Juett ................................ 126/25 R

*Primary Examiner*—Samuel Scott
*Assistant Examiner*—Jerry Anderson
*Attorney, Agent, or Firm*—William R. Hinds; George H. Dunsmuir

[57] ABSTRACT

A heat transfer device for use in a gas barbecue includes a solid cast iron plate, which is mounted in the barbecue between the burner and the food holding grate, i.e., in the position normally occupied by the lava bed. The plate has an irregular top surface resembling a lava bed and a plurality of holes permitting the passage of fats and juices from the food for reducing flaming. The device further serves to divide and control the flow of air and gases between chambers of the barbecue.

5 Claims, 4 Drawing Figures

HEAT TRANSFER DEVICE

BACKGROUND OF THE INVENTION

This invention relates to a heat transfer device and in particular to a heat transfer device for use in a gas barbecue.

All present gas fired barbecues use a porous lava or a similar material above a gas burner for cooking food placed on a grate above the lava bed. The lava and the air within the barbecue is heated by the gas burner and in turn heats the food. The lava also acts as a medium on which juices and fats are evaporated for heating the food and supplying the barbecue flavour.

The main problem encountered with the lava bed barbecue described above is flaming. The porous lava becomes saturated with fat and juices and ultimately ignites. Actually, the lava acts as a wick and the flame from the gas burner turns the lava into a torch. The obvious result is that the food must be removed or it will burn.

Various approaches have been taken to solving the problem of flaming in lava bed barbecues, including increasing the distance between the lava and the cooking surface on the assumption that if the food is kept sufficiently far from the lava, the speed or degree of burning due to flaming can be controlled. Another proposed solution is the use of cooking grates with grooves or channels carrying away some of the juices and fats so that they do not saturate the lava to the same extent as with ordinary food holding grates. Yet another method of solving the problem is the use of two burners, one on each side of the barbecue. The theory behind the twin burner approach is that by cooking on one side of the barbecue with only the burner on the other side of the barbecue operating, flaming can be avoided. While such a method is effective initially, ultimately the lava becomes saturated with fats and juices, which burn off when the barbecue is used again, i.e., when the burner on such side is ignited.

The major problem with lava is caused by the porous insulating qualities of the rock. Only very lightweight, porous lava can be used or other non-porous rocks may explode when heated to high temperatures. Because the lava is porous, it has excellent insulating qualities and does not readily transfer heat from the burner to the food. Moreover, because the lava is formed of individual pieces, there is poor heat conduction throughout the lava bed thus, most of the heat is transferred by high temperature convected air. These air currents are the main cause of uneven heating at the cooking area of the barbecue.

The object of the present invention is to solve at least partially the problems encountered with existing gas barbecues by providing a relatively simple substitute for the lava bed.

SUMMARY OF THE INVENTION

Accordingly, the present invention relates to a heat transfer device for use in a barbecue of the type including burner means, means for supporting food above the burner means and a heat transfer device between said burner means and said support means, said heat transfer device comprising a solid, one-piece, metal, heat conducting plate with a plurality of openings in said plate. The one-piece heat conducting plate is also designed to divide the botton portion of the gas barbecue into two distinct compartments and control the flow of air and gases between these compartments. Control of the flow of air and gases being accomplished by the plurality of the openings being of selected diameter provided in the body of the said plate.

The plate is preferably formed of solid cast iron, with the thickness of 3/16 to approximately ⅜ inch. At least the top surface of the plate is irregular, i.e., provided with projections and depressions so that the surface resembles a lava bed or charcoal. Of course, the plate can be any size to fit existing gas barbecues and manufacturer's size specifications.

BRIEF DESCRIPTION OF THE DRAWINGS

The invention will now be described in greater detail with reference to the accompanying drawings which illustrate a preferred embodiment of the invention, and wherein.

DESCRIPTION OF THE PREFERRED EMBODIMENTS

Figure 1:
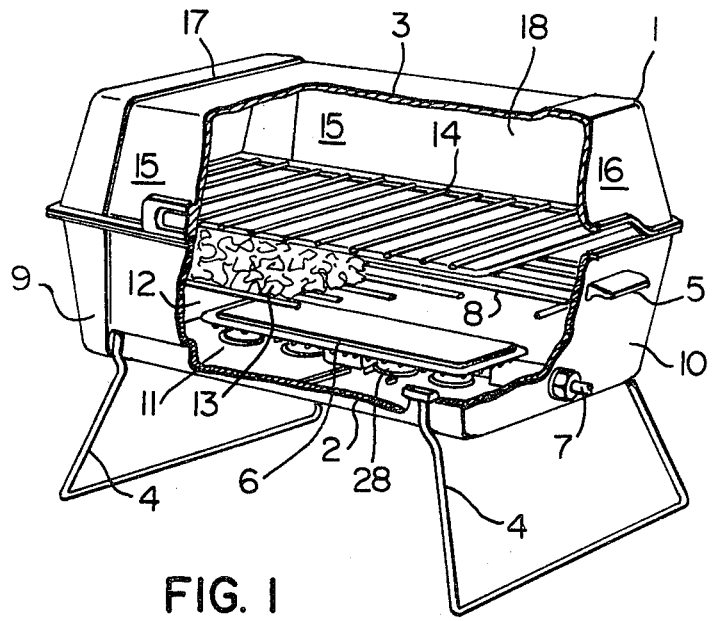
FIG. 1 is a perspective, partly sectioned view of a portable gas barbecue in accordance with the prior art.

With reference to FIG. 1, a conventional, portable gas barbecue includes a casing 1 defined by bottom portion 2 and a removable cover 3. The barbecue is supported on a table or other support by a pair of legs 4. Handles 5 (one shown) are provided on each side of the bottom portion 2 of the casing 1. A burner 6 is mounted in the bottom portion 2 and gas is introduced into the burner through an inlet duct 7 in one side of the bottom portion 2.

A grate 8 extends between front and rear walls 9 and side walls 10 and bottom wall 11 define a combustion chamber 12. A bed of lava 13 is mounted on the grate 8 for heating by the burner 6. A second grate 14 is mounted at the top of the bottom portion 2 of the casing 1 above the lava bed 13 for supporting food (not shown) to be cooked. The grate 14, end walls 15, side walls 16 and top wall 17 of the cover 3 define a cooking chamber 18.

As mentioned hereinbefore, during cooking, which, in the prior art is accomplished primarily by high temperature air and gases, fats and juices from the food tend to saturate the lava bed 13 and produce uncontrolled flaming. As a result, there is a very real risk that food will be burned.

Figure 2:
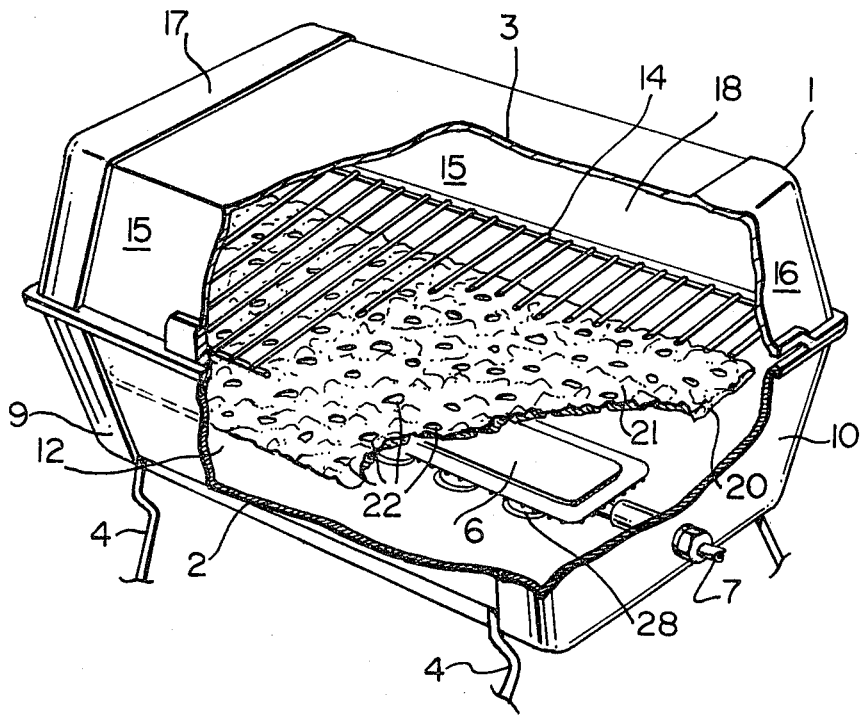
FIG. 2 is a perspective partly sectioned view of the gas barbecue of FIG. 1, incorporating the heat transfer device of the present invention.

Referring now to FIG. 2, the heat transfer device of the present invention will now be described. The reference numerals of FIG. 1 have been used in FIG. 2 wherever possible to identify the same or similar elements.

Figure 3:
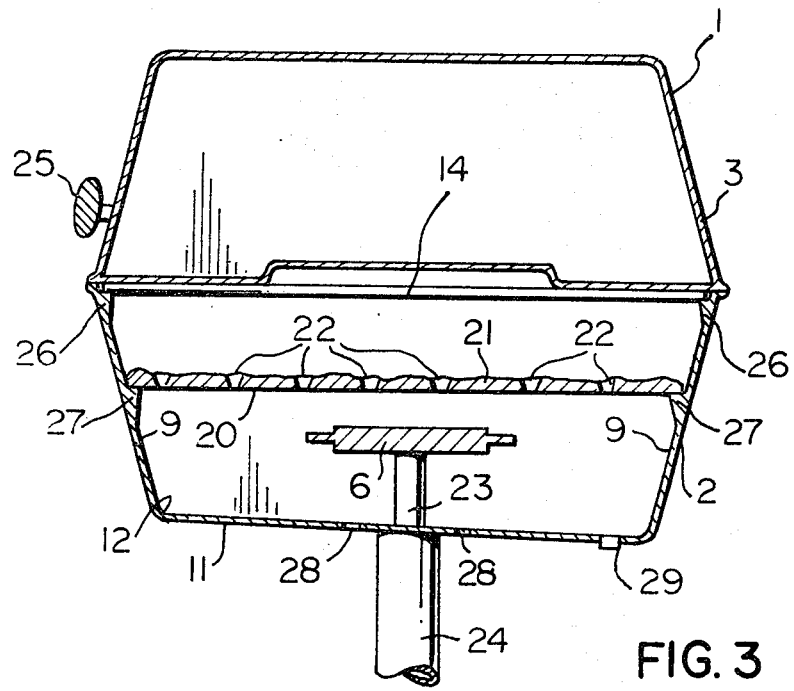
FIGS. 3 and 4 are cross-sectional views of a fixed gas barbecue incorporating the heat transfer device of the present invention.
Figure 4:
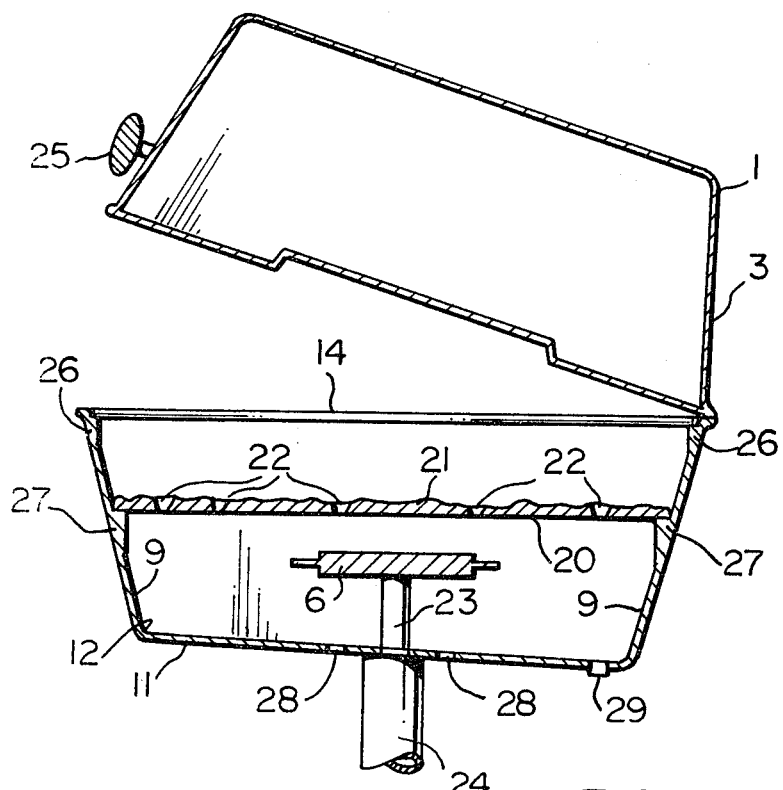

The barbecue of FIG. 2 is the same as that of FIG. 1, except that the grate 8 and the lava bed 13 are replaced by a heat transfer device in accordance with the present invention. As illustrated in FIGS. 3 and 4, the heat transfer device can also be used in a fixed, i.e., non-portable barbecue.

The heat transfer device, according to the present preferred embodiment, is defined by a single sheet or plate 20 of, for example, cast iron having a thickness of approximately ⅜ inch. The plate 20 is capable of withstanding high temperatures without warping or cracking. The dimensions of the plate or plates 20 are such that the plate can be used in existing barbecues, or the plate is produced to fit new barbecues in accordance with a manufacturer's size requirements. Top surface 21 of the plate 20 is irregular, i.e., the top surface 21 is provided with projections and depressions so that such top surface resembles a lava bed or charcoal. A plurality of irregularly shaped openings 22 are provided in the plate 20 at the bottom of depressions, so that liquid from the food cooked in the barbecue tends to flow toward and through such openings 22. The sides of the openings 22 are inclines, i.e., the openings taper downwardly to promote flow through the centres of the openings. The openings 22 are sized and spaced to supply proper ventilation of combustion chamber 12.

It is to be understood, however, that dependent upon the size of the barbecue, one or more plates 20 may be utilized.

The barbecue of FIGS. 3 and 4 includes essentially the same elements as that of FIG. 2, except that the inlet duct 7 is replaced by an inlet duct 23 from a central post 24 on which the barbecue is mounted. The cover 3 is provided with a handle 25 for moving the cover from the closed position (FIG. 3) to the open position (FIG. 4). Of course, the cover 3 is pivotally connected to the bottom portion 2 of the casing for such purpose. The grate 14 rests on ledges 26 at the top edge of the bottom portion 2 and the plate 20 rests on ledges 27 on the front and rear walls 9 of the bottom portion 2. The bottom wall 11 of the bottom portion 2 of the casing slopes slightly rearwardly and is provided with a plurality of openings 28 to supply air to the combustion chamber 12 and a single drain opening 29 at the lowest part of the bottom portion 2 of the casing.

With the plate 20 installed in a barbecue, heat from the gas burner 6 is spread by conduction and radiated evenly throughout the cooking chamber 18. The openings 22 in the plate 20 ensure proper ventilation of the combustion chamber 12. The heat transfer device is designed to take advantage of the Leidenfrost effect. When a drop of water hits a hot metal surface, the drop does not touch the surface, but floats on a vapour film and the droplet takes a relatively long time to evaporate—this is the Leidenfrost effect. Juices from the food strike the plate 20 and form a vapour before flowing through the holes 22. Finally, the plate 20 is virtually self-cleaning.

In use, the plate 20 is installed in position and when it has been heated to the proper temperature, food is placed on the grate 14 or suspended above the plate 20 by other means such as a rotisserie. When cooking with the cover 3 open (FIG. 4), juices and fats from the food strike the hot plate 20 and, because of the Leidenfrost effect, a vapour barrier is formed between the droplets and the surface of the plate 20. Because of the shape of the top surface 21 of the plate 20, the droplets quickly pass into the combustion chamber 12. The initial contact of the droplets with the plate 20 produces smoke and some flame, which impart flavour and colour to the food being cooked. Because the plate is non-porous, no wicking occurs. Droplets entering the combustion chamber 12 contact flames from the burner 6 and burn to produce smoke, which is vented through the openings 22 into the cooking area. Any juices and fat remaining in the combustion chamber 18 are drained through the drain opening 29.

Barbecuing with the cover 3 open is slower and results in less barbecue flavour in meat. Most gas barbecue manufacturers suggest that cooking be done with the cover 3 closed (FIGS. 2 and 3). However, with the cover 3 closed, according to the prior art, uncontrolled flaming in the cooking chamber 18 is common. With the present invention, and cover 3 closed, the plate 20 in position, high temperatures, relatively little flaming occurs in the cooking chamber 18. Moreover, the plate 20 results in large quantities of flavour imparting smoke which is desirable when barbecuing.

The reduction in flaming and the production of smoke are effected in the following manner. After the droplets of fats and juices pass through the openings 22 some of them burn in the combustion chamber 12. Such burning in the combustion chamber 12 consumes most or all of the oxygen necessary to support combustion above the plate 20. The smoke vents into the cooking chamber 18. The lack of oxygen, coupled with temperatures high enough to vapourize additional droplets, produces large quantities of flavour imparting smoke, without flaming. Because it is desirable to give some colour to food, flaming can be promoted merely by lifting the cover 3.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example, equivalent elements may be substituted for those illustrated and described herein, parts may be used independently of the use of other features, all as will be apparent to one skilled in the art after having the benefits of the description of the invention.

What I claim is:

1. In a gas barbecue of the type including burner means, food support means for supporting food above the burner means, and a heat transfer device between said burner means and said support means, all enclosed within a casing having an openable cover, the improvement wherein said heat transfer device comprises at least one solid one-piece, metal heat conducting plate of sufficient thickness and strength to be self-supporting in span if supported at its edges, and having a generally continuous surface formed with a plurality of spaced openings in said plate separated by substantial surface portions of the plate, said openings extending through said plate from the top surface to the bottom surface thereof, the top surface of said plate being formed with projections and depressions to resemble a lava bed or charcoal, the areas of said top surface around each of said openings being inclined toward said openings to promote the flow of food juice droplets into and through said openings, the inclinations and extent of said areas being such that in use at least a substantial number of food juice droplets at least partially vaporize while floating on vapor films and flowing along said areas toward said openings.

2. Apparatus as claimed in claim 1 wherein said openings taper inwardly from the top to the bottom surface of the plate.

3. Apparatus as claimed in claim 2 wherein said plate divides and controls the flow of air and gases between chambers of said casing.

4. Apparatus as claimed in claim 3 wherein said plate has a thickness of 3/16 to ½ inch.

5. Apparatus as claimed in claim 4 wherein said plate is a sheet of cast iron of about ⅜ inch thickness.

* * * * *